(12) United States Patent
Preston

(10) Patent No.: US 8,740,271 B1
(45) Date of Patent: Jun. 3, 2014

(54) REUSABLE CONTAINER HANDLE

(71) Applicant: Mark Preston, Burien, WA (US)

(72) Inventor: Mark Preston, Burien, WA (US)

(*) Notice: Subject to any disclaimer, the term of this patent is extended or adjusted under 35 U.S.C. 154(b) by 0 days.

(21) Appl. No.: 13/857,156

(22) Filed: Apr. 5, 2013

(51) Int. Cl.
*A47J 45/00* (2006.01)

(52) U.S. Cl.
USPC .......................................... 294/27.1; 294/25

(58) Field of Classification Search
CPC ......... A47J 45/10; A61F 13/105; B65G 7/12; A45F 5/10; A45F 5/02; A45F 5/00; A45F 2200/0516; A45F 5/021; A45F 3/04; A45F 3/02; A47G 19/303; Y10S 224/93; Y10S 16/12; G06F 1/1628; G06F 2200/1633; A45C 11/00; A45C 13/02; A45C 13/26; A45C 5/14; A45C 2013/025; B25G 1/102; E05B 1/0015; H01M 2/1005; B65D 2571/0066
USPC .............. 294/5, 25, 27.1, 137, 142, 16, 99.1, 294/902; 224/217, 218, 930; 206/320, 206/45.24; 16/110.1, 406, 407, 411, 422, 16/426, 430, 444
See application file for complete search history.

(56) References Cited

U.S. PATENT DOCUMENTS

| | | | | |
|---|---|---|---|---|
| 3,934,915 | A * | 1/1976 | Humpa | 294/99.2 |
| 6,494,517 | B1 * | 12/2002 | Durant | 294/99.2 |
| 7,862,095 | B2 * | 1/2011 | Rodriguez | 294/99.2 |
| 2003/0230906 | A1 * | 12/2003 | Bennett et al. | 294/99.2 |

* cited by examiner

*Primary Examiner* — Stephen Vu

(57) ABSTRACT

An ergonomic handle is used in conjunction with a ductile material, e.g., straps, for securing, lifting and carrying objects. The handle comprises four legs perpendicular to each other and joined at a center routing bowl. The center bowl includes an angled tab arm over its top. Each flat surfaced leg with side rails provides a channel for the strap material. Each leg includes a locking tab fixed to one side of the leg. Integral gripping teeth are on one face of the locking tab and mate with similar integral gripping teeth on the channel surface of each leg. The strap is placed on a leg surface, secured with the locking tab, then wrapped around the object to the second leg and secured. At the center bowl, the strap is re-directed to a third leg, secured, then wrapped around the object for securing on the fourth leg.

6 Claims, 3 Drawing Sheets

REUSABLE CONTAINER HANDLE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Field of the Invention, this invention relates to handles and more particularly, it relates to handles used in conjunction with straps or similar securing material.

Background Art, individuals consistently use containers, most commonly boxes, for the storage and transportation of items. Whether it be a manufacturer's product packaging or a container specially designed for an individual's use, these containers and/or boxes may or may not have handles incorporated into them. These handles may be an addition to the packaging or can simply be hand holes cut into their sides.

Containers with dual handles, for example, boxes, require the use of two hands for the balanced lifting of the container. Lifting it with a single hand would create an unbalanced situation, possibly shifting the contents and/or potentially tearing the area around the handle if the load exceeds the material capacity of that single lifting point.

A user wanting to carry a separate object in addition to a dual handle container is prevented from doing so if the user is already holding the container with two hands. Additionally, in the case of hand holes, the interior contents may prevent adequate grip for safe lifting of the container.

Once these boxes are opened, merely closing the flaps or setting on a separate lid typically doesn't offer a long term method of securing its closure. Adhesive tape is commonly used, however, the adhesive can fail over time, through age and/or repeated access to the contents of the container. Frequently, removal of the tape, whether a single instance or repeated removals, can damage the container and possibly destroy its structural integrity; most often, the wasteful re-application of new adhesive tape is required for re-securing the container.

These foregoing observations demonstrate the need for an apparatus and method for facilitating repeated securing, lifting and movement of containers that may or may not have handles incorporated into them.

BRIEF SUMMARY OF THE INVENTION

An ergonomic handle is used with a strap to secure and/or lift an object.

This invention has been developed in response to the current state of the art for handles to be attached to movable containers and/or objects that may or may not have integral handles.

The apparatus is configured to facilitate the repeated securing, lifting and moving of these objects. The apparatus comprises of a cross-shaped handle having four legs perpendicular to each other attached at a center routing bowl. Each leg has a flat surface with side guide rails and includes gripping teeth on one face that mate with the gripping teeth on the face of an attached locking tab on that same leg. The apparatus has a bowl-shaped center, joining the legs, with an angled cross arm to facilitate the routing of a ductile member, e.g., a strap, to the other legs of the handle. One end of a ductile member, such as a non-adhesive backed strap, is placed over the teeth on the face of a leg, extending away from the handle, then secured between the teeth of this first leg and the teeth of the attached locking tab which is folded over the ductile member and latched in place. The ductile member is tightly wrapped around the object's perimeter to align with the second leg of the handle directly opposite the previously chosen first leg of the handle. The ductile member is similarly latched in place on this second leg, then routed under the 45 degree angled arm of the center routing bowl and folded over the top of the angled arm to re-direct the ductile member 90 degrees toward the third leg of the handle wherein, the ductile member is similarly secured with the locking tab of this third leg. The ductile member is then tightly wrapped around the object's perimeter to align with the fourth leg of the handle and then the ductile member is similarly secured with the locking tab of the fourth and final leg of the handle. Reversing the procedure to remove the ductile member enables access to the object's interior contents. The same handle and ductile member can be re-used indefinitely on the selected container.

BRIEF DESCRIPTION OF THE SEVERAL VIEWS OF THE DRAWING

In addition to the description of the invention above, the appended drawings will reference specific embodiments of the invention and are not therefore, to be considered to be limiting of its scope, will provide additional specificity and detail, in which.

DETAILED DESCRIPTION OF THE INVENTION

Figure 1:
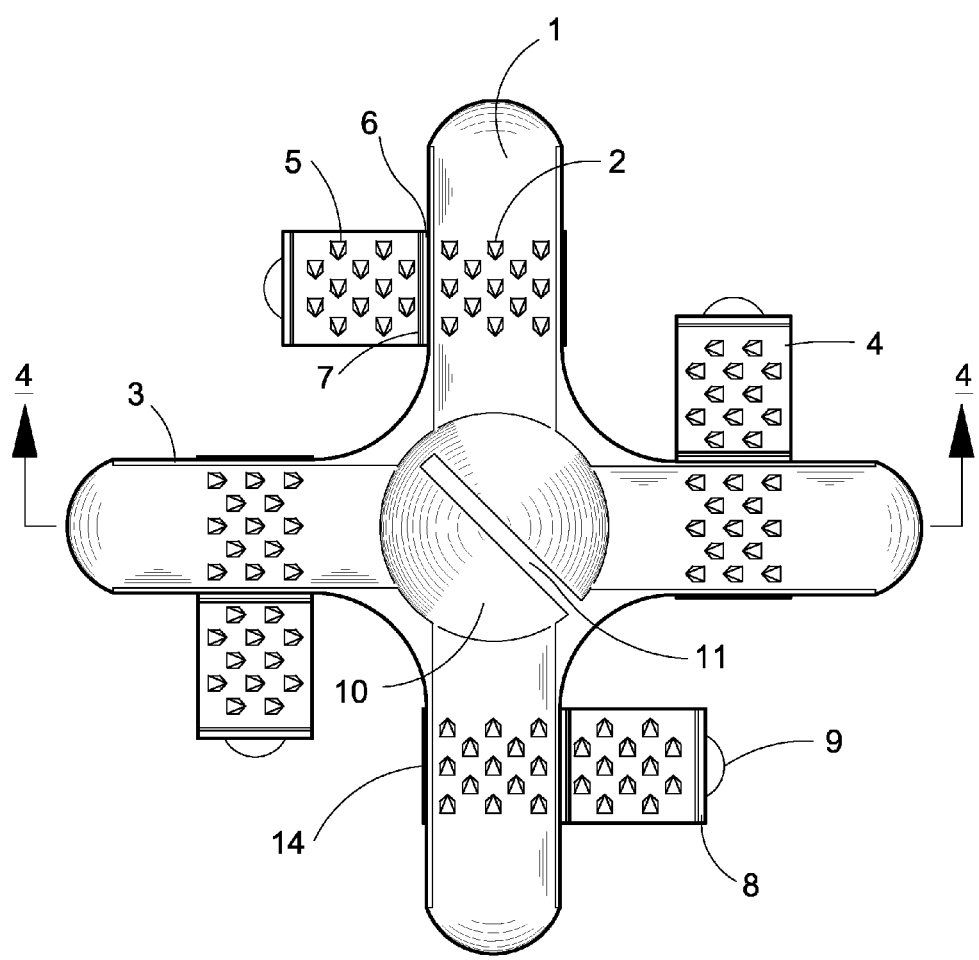
FIG. 1 illustrates the top view of the handle.

The top view of the handle is illustrated in FIG. 1. The handle is placed in this orientation on top of a container or object to be secured. The cross-shaped handle consists of four symmetrically placed legs (1), each with a flat face with integral gripping teeth (2) directed toward the center routing bowl (10) and side rails (3) of sufficient height to accommodate the ductile member, each leg with an integral locking tab (4), the locking tab (4) to have gripping teeth (5), directed toward the center routing bowl (10) that mate with the gripping teeth (2) of the leg (1) when the tab (4), with its edge locking shoulder (8), is snapped onto protruding locking shoulder (14). Operation of the locking tab (4) is assisted with a protruding thumb tab (9) and guide tab (7). The locking tab (4) has a flexible joint (6) to affix it to leg (1) around a central routing bowl (10) with projecting directional arm (11). A ductile member, for example, a strap of sufficient length to wrap around the container once completely in one direction, then once completely in the direction perpendicular to the first direction, of a width equal to the width of a selected leg (1), is placed on the face of leg (1) and over its gripping teeth (2). Locking tab (4) is placed over the ductile member so that its gripping teeth (5) contact the ductile member, mates with gripping teeth (2) and the tab edge locking shoulder (8) snaps onto the protruding locking shoulder (14). The ductile member is directed away from the center routing bowl (10) and tightly wrapped around the object's perimeter and brought onto the opposite leg of the selected initial leg (1). The ductile member is placed over the second leg's gripping teeth (2) and the locking sequence as noted above is repeated. After the ductile member is secured on the second leg, the ductile member is placed into the central routing bowl (10) and under the angled routing arm (11). The ductile member is lifted up and folded over the routing arm (11) 90 degrees and directed away from the center routing bowl (10) and on to the third leg (1) of the handle and over its gripping teeth (2). The locking sequence as described above is repeated on the third leg. The ductile member is tightly wrapped around the object's perimeter away from the third leg and brought up onto the fourth leg (1) and its gripping teeth (2). The final locking tab (4) is latched and the object is secured.

Figure 2:
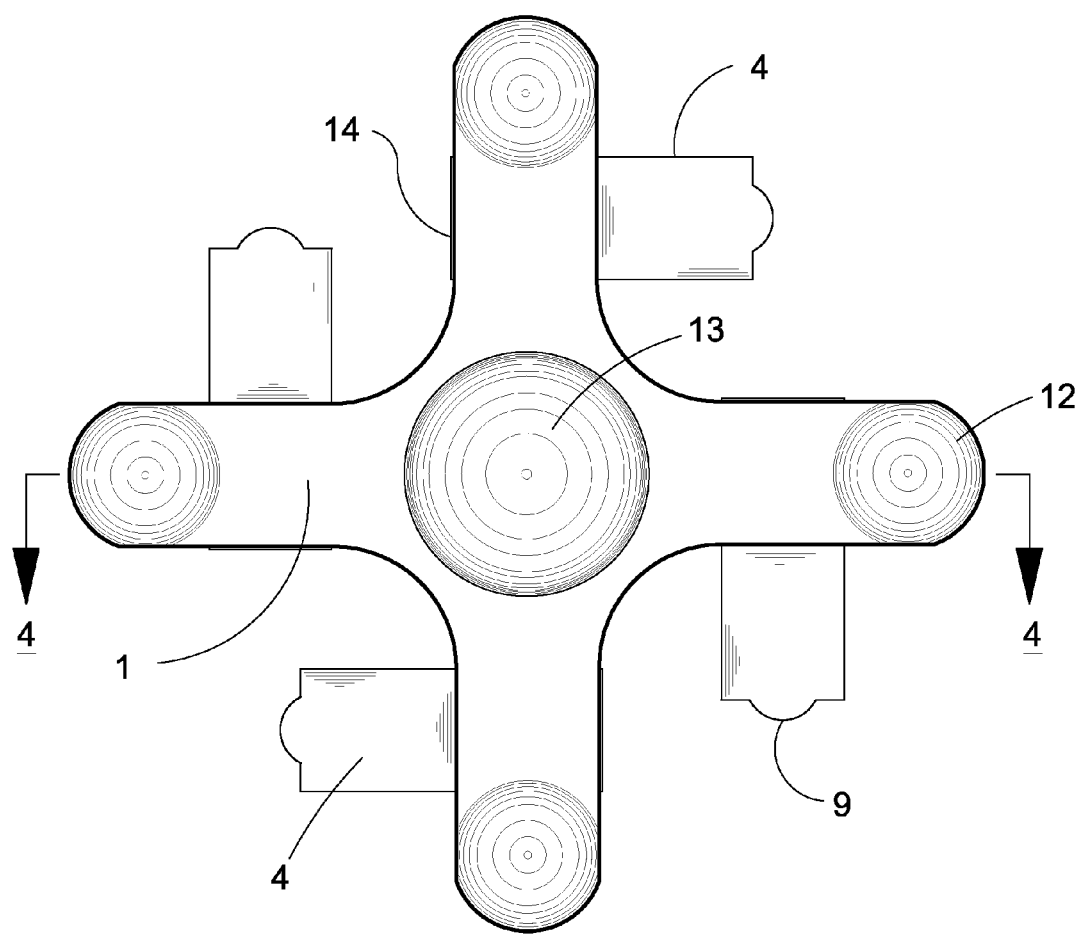
FIG. 2 illustrates the bottom view of the handle.

FIG. 2 illustrates the underside of the invention and denotes the rounded thickened edge (12) of each leg (1) and the underside of the center routing bowl (13). Also visible are the undersides of the locking tab (4) with its protruding thumb tab (9) and the protruding locking shoulder (14). The thickened leg ends (12) in conjunction with the center routing bowl (13) provide a gap of sufficient depth between the handle legs (1) and the object to be secured, to allow for placement of fingers by the User under the handle to provide a center lift point of the object.

Figure 3:
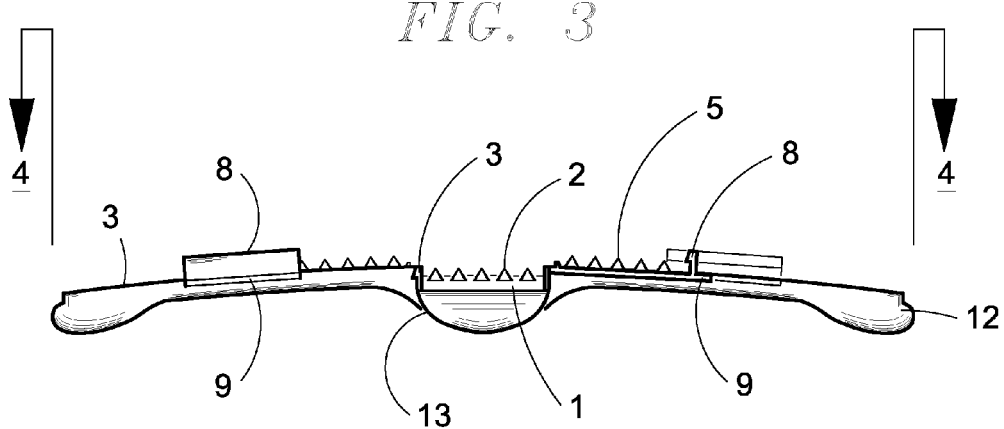
FIG. 3 illustrates the side view of the handle.

FIG. 3 illustrates a side view of the handle with the finger clearance visible that will be created by the thickened leg ends (12) and the center routing bowl (13) as the handle makes contact atop the object to be secured and lifted.

Figure 4:
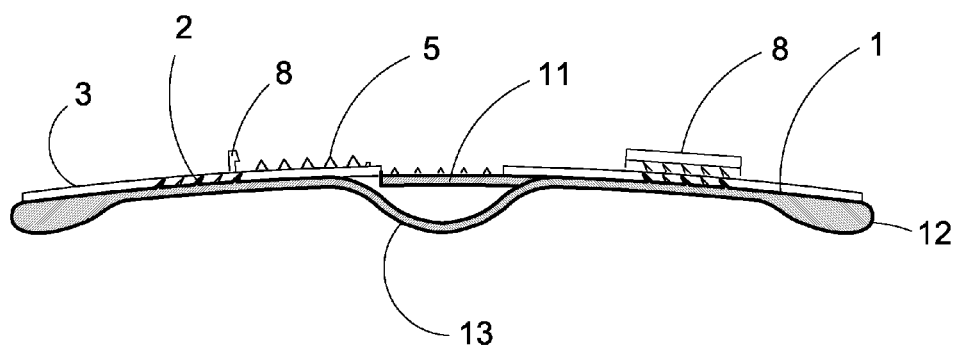
FIG. 4 illustrates a cross-section view of the handle.

FIG. 4 is a cross-section of the handle through opposing legs (1) illustrating the relationship of the center routing bowl (13) to the thickened leg ends (12). It further illustrates the center routing arm (11) placed in the same plane as the top flat surface of the legs (1). The gripping teeth (2) are of a height not to exceed the leg guide rails (3). The gripping teeth (5) of the locking tab (4) also are of a height not to exceed the leg guide rails (3). The edge locking shoulder (8) of a tab (4) will be of sufficient depth to fully engage the protruding locking shoulder (14) of each leg (1).

It will be apparent to those of ordinary skill in the art that this invention will accommodate the infinite varieties in size, materials and shapes of object to be secured and moved with this handle, and any variations of the handle in size, materials, shape, form, function and manner of operation, assembly and use may be made, without departing from the principals and concepts of the invention as set forth in the claims.

What is claimed is:

1. A handle to facilitate securing, lifting, or moving an object and used in conjunction with a ductile member, said handle comprising: a one-piece metal or plastic molding having four legs each with a locking tab, wherein each of the legs being connected perpendicular to two of the other legs and to a center routing bowl;
   each of the legs having a sufficient width to accommodate the ductile member;
   each of the legs having side guide rails of sufficient depth to accommodate the ductile member;
   each of the legs having integral protruding gripping teeth on a top face and adjacent to the locking tab;
   each of the legs having a thickened end at an end located opposite of the center routing bowl to provide space to accommodate finger placement elsewhere on an underside of the legs;
   each of the legs having one of the locking tabs affixed at a flexible joint along one side;
   each of the locking tabs having integral protruding gripping teeth on a face of the locking tabs;
   each of the leg side guide rails opposite to each of the locking tab joint incorporating a protruding shoulder configured to receive and secure each of the locking tabs;
   each of the locking tabs having a thumb protrusion to assist in locking or unlocking each of the locking tabs;
   each of the locking tabs having a guiding side rail at the joint side;
   each of the locking tabs having a side guide rail opposite to the joint side of the guiding side rail and configured to create a positive lock with the corresponding shoulder of the leg;
   the center routing bowl having sufficient depth to provide finger grip space under each of the legs;
   the center routing bowl includes a single routing tab arm on top; and
   the single routing tab arm set at 45 degrees to the legs and affixed at one end only.

2. The handle according to claim 1, wherein each of the legs having rounded edges.

3. The handle according to claim 1, wherein the gripping teeth having a height not exceeding the height of the side guide rails on any of the legs or locking tabs.

4. The handle according to claim 1, wherein the gripping teeth of the locking tab are off-set with the gripping teeth of the leg when one of the locking tabs is secured to one of the legs.

5. The handle according to claim 1, wherein each of the locking tabs having sufficient width and depth to facilitate positive locking with each of the legs when a ductile member is affixed between the leg and locking tab.

6. The handle according to claim 1, wherein the routing tab arm having sufficient thickness to remain flushed with the handle when all of the locking tabs are engaged and secured.

* * * * *